UNITED STATES PATENT OFFICE

MAHLON J. RENTSCHLER, OF WILLOUGHBY, OHIO, ASSIGNOR OF ONE-HALF TO WILLIAM R. JEAVONS, OF CLEVELAND HEIGHTS, OHIO

PROCESS OF MANUFACTURING BARIUM OXIDE

No Drawing. Application filed February 18, 1931. Serial No. 516,842.

This invention relates to a process of making porous or spongy barium oxide (BaO); also to the production of refractory containers or saggers which are employed in the manufacture of such barium oxide and which special containers are employed in and contribute to the realization of the aforesaid process.

Barium oxide as employed generally in the arts, as in sugar refining, etc., is a fused, non-porous product, of poor reactivity, which is produced only at high temperatures and which is suitable only for conversion into hydrates, unless subjected to special conditioning processes. On the other hand, porous or spongy barium oxide, which is produced at a considerably lower temperature, is suitable for all uses in the industrial arts for which ordinary barium oxide is suitable and without the necessity for subjecting the same to special conditioning processes.

This porous or spongy barium oxide is made by mixing intimately together barium carbonate and finely divided pure carbon black in the following proportions by weight: barium carbonate 197.37, carbon 12. The mixture is made preferably in the presence of sufficient moisture to form a compact, adhesive mass; and this mass is placed in the saggers, produced in the manner hereinafter described, and the mixture is then subjected to a temperature of approximately 1850° F. and not exceeding 2700° F. When subjected to such temperature for a sufficient length of time, porous or spongy barium oxide is produced in accordance with the following equation:

$$BaCO_3 + C = BaO + 2CO$$

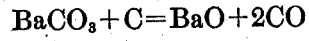

However, it is essential that the mixture of barium carbonate and carbon shall be protected against the access of furnace gases thereto during the firing operation; also that, prior to the stage at which the above reaction begins, it shall be protected from any vagrant oxygen or other gases, such as might be liberated from the clay constituent of the saggers under the high temperature to which the latter are subjected.

I am enabled to protect the mixture within the saggers from gases which might pass through the sagger walls (whether the gases be furnace gases or gases including the vagrant gases referred to) by the manner of making and using the saggers, which will now be described.

I pug together approximately 55 parts by weight of fire clay and approximately 45 parts by weight of carbon, preferably in the shape of ordinary by-product coke. For the coke I prefer to use the following proportions by weight and sizes:—100 parts through a 4-mesh screen, 75 parts through an 8-mesh screen, and 37½ parts through a 16-mesh screen.

The clay and the coke are pugged together to form an intimate mixture, after which this mixture is molded into saggers or containers of suitable shape and dimensions. In ordinary practice, the saggers are about 12" high, by 10" in diameter, and having a wall thickness of about 1".

Saggers which are thus molded do not require any prolonged drying prior to use. In practice, it has been found sufficient to dry them in a room of ordinarily warm temperature for about 24 hours, after which they can be used; on the other hand, it is undesirable to have the molded saggers too moist when used, as the moisture will be detrimental to the reaction which occurs in the mixtures within the saggers. However, when the saggers are prepared in the manner described and the mixture is introduced into the saggers, the moisture will be expelled before the temperature in the furnace reaches the reaction point for the mixture, said temperature being about 1850° F. and above. In introducing the mixture into the saggers, a space is preferably provided between the exterior of the mixture in each sagger and the inner wall of the latter.

After having been dried and filled, the saggers are stacked in vertical rows, of four or five in each row, in a down-draft kiln, each sagger except the uppermost one in each row covering the top of the sagger therebeneath; a cover, of the same material as the saggers themselves, is applied to the uppermost sagger in each stack. The saggers are so arranged in the kiln that the spaces between the stacks of saggers are utilized as passageways for the combustion gases, thus forming series of draft tunnels. The barium carbonate carbon mixture is thus heated inside the saggers under conditions which permit the reaction set forth hereinbefore to take place quantitatively. The temperature employed in this process is not above 2700° F. and is consequently sufficiently low to prevent the finished product within the saggers from fusing or sintering, thus producing a barium oxide of maximum porosity and activity. The large quantities of carbon monoxide that are evolved in the reaction between the carbon black and the barium carbonate contribute to scavenging the interiors of the saggers. In practice, it has been found that, with an ordinary coal-fire down-draft or tunnel kiln, heating the saggers and their contents for about 36 hours is sufficient to convert the mixture in each sagger into porous or spongy barium oxide, it being noted that the first 8 or 9 hours of this period are required to bring the temperature in the furnace or kiln to the reaction point.

Due to the high proportion of the carbon in the saggers, to the thickness of their walls, and to the intimate and thorough distribution of the carbon throughout the saggers, the saggers are of themselves capable of reducing (through the presence of the carbon) any furnace gases that might otherwise penetrate the walls thereof and contact with the mixture therewithin, without the necessity of applying any external glaze to the saggers. This ability of the saggers to intercept and reduce the furnace gases is due to the intimate and thorough distribution of the carbon throughout the sagger walls, which distribution is due to the fact that a considerable portion of the carbon employed is in a fine condition. However, the relatively high proportion of large carbon particles also present serves as a grog, which permits the rapid drying and subsequent firing of the saggers without cracking, imparting great strength to the walls or bodies of the saggers. Furthermore, I am enabled to use low-priced carbon and to dispense with highly-skilled operators in the production and use of the saggers; and although the oxidizing gases in the furnace will consume part of the carbon constituent of each sagger (but without access, through the sagger wall, to the mixture therewithin), the saggers are so inexpensive that they may be thrown away after having been used but once and new ones employed for each subsequent manufacture of barium oxide; and the cost of such manufacture throughout an extended period will be much less than has been possible heretofore, even where it has been possible to use more than once the much more expensive saggers known to the trade. It is possible to crush the cheaper saggers made in accordance with my invention herein described and to employ the resultant particles as grog in the production of new saggers, provided that the carbon content is replenished.

Having thus described my invention, what I claim is:

1. The process of producing porous or spongy barium oxide which consists in intimately mixing barium carbonate and pure finely divided carbon in proportions suitable to yield, when heated, barium oxide and carbon monoxide; enclosing the mixture in a sagger containing sufficient carbon to prevent detrimental furnace gases from penetrating the walls of the sagger and contacting with the said mixture therewithin; and heating the sagger and the mixture in a suitable furnace at a temperature not materially lower than 1800° F. and not materially higher than 2700° F.

2. The process of producing porous or spongy barium oxide which consists in intimately mixing barium carbonate and pure finely divided carbon in proportions suitable to yield, when heated, barium oxide and carbon monoxide; moistening and compacting the mixture; enclosing the compacted mixture in a sagger composed of an intimate mixture of clay and carbon, with the carbon constituent constituting not materially less than 45% by weight of the sagger; and heating the mixture and the sagger in a suitable furnace at a temperature not materially lower than 1800° F. and not materially higher than 2700° F.

3. The process of producing porous or spongy barium oxide which consists in intimately mixing barium carbonate and pure finely divided carbon in proportions suitable to yield, when heated, barium oxide and carbon monoxide; enclosing the mixture in a sagger composed of an intimate mixture of clay with carbon, the carbon being present in a sufficient quantity to prevent detrimental furnace gases from penetrating the wall of the sagger and contacting with the mixture therewithin; and heating the mixture and the sagger in a suitable furnace at a temperature not materially lower than 1800° F. and not materially higher than 2700° F.

4. The process of producing porous or spongy barium oxide which consists in intimately mixing barium carbonate and pure finely divided carbon in proportions suitable to yield, when heated, barium oxide and carbon monoxide; enclosing the mixture in a sagger composed of an intimate mixture of clay and carbon in approximately the proportions by weight of 55 parts of clay to 45 parts of carbon, the carbon constituent consisting of approximately the following sizes and proportions by weight: 100 parts passing through a 4-mesh screen, 75 parts passing through an 8-mesh screen, and 37½ parts passing through a 16-mesh screen, and heating the mixture and the sagger in a suitable furnace at a temperature not materially lower than 1800° F. and not materially higher than 2700° F.

In testimony whereof, I hereunto affix my signature.

MAHLON J. RENTSCHLER.